(12) United States Patent
Takeuchi et al.

(10) Patent No.: US 10,338,330 B2
(45) Date of Patent: Jul. 2, 2019

(54) OPTICAL TRANSCEIVER AND OPTICAL TRANSCEIVER INSERTION/EJECTION MECHANISM

(71) Applicant: SUMITOMO ELECTRIC DEVICE INNOVATIONS, INC., Yokohama-shi (JP)

(72) Inventors: Yuko Takeuchi, Yokohama (JP); Hidemi Sone, Yokohama (JP); Masato Hino, Yokohama (JP)

(73) Assignee: SUMITOMO ELECTRIC DEVICE INNOVATIONS, INC., Yokohama-shi (JP)

( * ) Notice: Subject to any disclaimer, the term of this patent is extended or adjusted under 35 U.S.C. 154(b) by 0 days.

(21) Appl. No.: 15/977,203

(22) Filed: May 11, 2018

(65) Prior Publication Data
US 2018/0329161 A1    Nov. 15, 2018

(30) Foreign Application Priority Data

May 11, 2017    (JP) ................. 2017-094768

(51) Int. Cl.
| | | |
|---|---|---|
| H05K 5/00 | (2006.01) | |
| G02B 6/42 | (2006.01) | |
| H04B 10/40 | (2013.01) | |
| H01R 13/633 | (2006.01) | |

(52) U.S. Cl.
CPC .......... *G02B 6/4261* (2013.01); *G02B 6/428* (2013.01); *G02B 6/4246* (2013.01); *H01R 13/6335* (2013.01); *H04B 10/40* (2013.01)

(58) Field of Classification Search
CPC ... G02B 6/4261; H01R 13/6335; H04B 10/40
USPC ............... 361/754; 439/76.1, 372, 350, 352; 385/92, 53, 88, 134
See application file for complete search history.

(56) References Cited

U.S. PATENT DOCUMENTS

| | | | | |
|---|---|---|---|---|
| 6,538,882 | B2* | 3/2003 | Branch .............. | H01R 13/6275 361/679.02 |
| 6,746,158 | B2* | 6/2004 | Merrick ............... | G02B 6/4201 24/605 |
| 9,263,831 | B2* | 2/2016 | Shen .................. | H01R 13/6272 |
| 2005/0141827 | A1* | 6/2005 | Yamada ............... | G02B 6/4201 385/92 |

FOREIGN PATENT DOCUMENTS

JP    2014-153381 A    8/2014

* cited by examiner

*Primary Examiner* — Hung S. Bui
(74) *Attorney, Agent, or Firm* — Baker Botts L.L.P.; Michael A. Sartori

(57) ABSTRACT

The optical transceiver includes a case that has a second engagement portion engaging with a first engagement portion provided in the cage to prevent the optical transceiver from being ejected from the cage, a slider that moves relative to the case in the first direction with respect to the case, and a pusher that is oscillatably supported by the case via an oscillation shaft extending in a second direction and disengages the first engagement portion and the second engagement portion from each other by pushing the first engagement portion in a third direction while being interlocked with a movement of the slider. The oscillation shaft is positioned in an ejecting direction with respect to an interlocking part of the slider and the pusher.

12 Claims, 19 Drawing Sheets

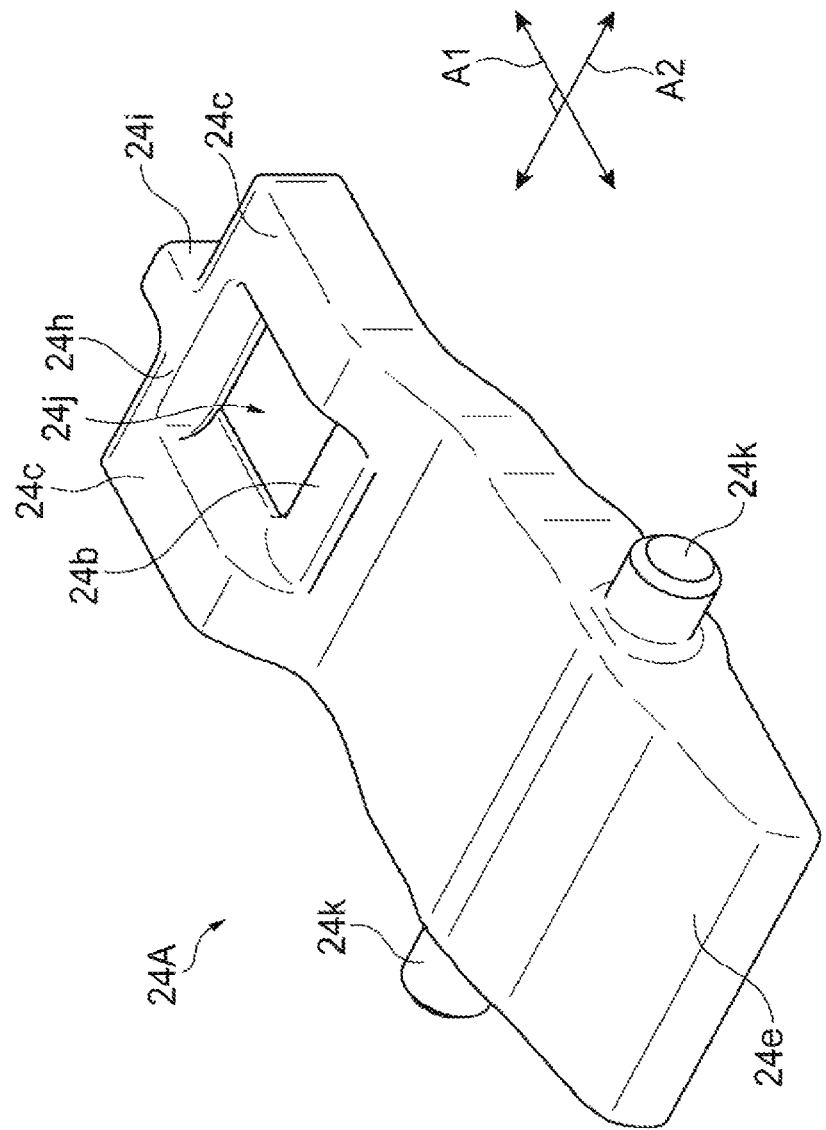

OPTICAL TRANSCEIVER AND OPTICAL TRANSCEIVER INSERTION/EJECTION MECHANISM

TECHNICAL FIELD

The present disclosure relates to an optical transceiver and an optical transceiver insertion/ejection mechanism.

BACKGROUND

Patent Literature 1 discloses a structure of an optical transceiver which is inserted into a cage of a host device. The optical transceiver includes a slide member which slides along a case. When the slide member slides along the case, the slide member pushes out an engagement piece using a protrusion on its side to be disengaged from the engagement piece of the cage of the host device.

SUMMARY

FIGS. 17A and 17B are enlarged cross-sectional views of an engagement piece 102 of a cage 101 and a slide member 103 of an optical transceiver in an optical transceiver insertion/ejection mechanism in the related art (for example, refer to Japanese Unexamined Patent Publication No. 2014-153381). The engagement piece 102 of the cage 101 has one end positioned on an opening side of the cage 101, and the other end positioned on a side opposite to the opening of the cage 101. One end of the engagement piece 102 is connected to a side wall of the cage 101, and the other end of the engagement piece 102 is a free end. The slide member 103 has a protrusion 103a on its side and slides along the case 104 of the optical transceiver. As illustrated in FIG. 17A, in a state in which the optical transceiver is inserted into the cage 101, the engagement piece 102 of the cage 101 engages with a step (not illustrated) on a side surface of the optical transceiver, so that unintended ejection of the optical transceiver is prevented. In addition, as illustrated in FIG. 17B, when the optical transceiver is ejected from the cage 101, the slide member 103 slides to the opening side of the cage 101 and the protrusion 103a pushes out the engagement piece 102, so that the engagement piece 102 and the step are disengaged from each other.

In the optical transceiver insertion/ejection mechanism, one end of the engagement piece 102 positioned on the opening side of the cage 101 is connected to the side wall of the cage 101. On the other hand, it is possible to consider a configuration in which one end of an engagement piece on a side opposite to an opening is connected to a side wall of a cage. FIGS. 18A and 18B are enlarged cross-sectional views of a structure in the vicinity of an engagement piece 201 of a cage 204 in such an optical transceiver insertion/ejection mechanism. The engagement piece 201 of the cage 204 has one end positioned on a side opposite to an opening of the cage 204, and the other end positioned on the opening side of the cage 204. One end of the engagement piece 201 is connected to a side wall of the cage 204, and the other end of the engagement piece 201 is a free end. Moreover, in order to prevent a protrusion 202a on a side surface of a case 202 of the optical transceiver and the other end of the engagement piece 201 from interfering with each other when the optical transceiver is inserted into the cage 204, the other end of the engagement piece 201 is curved outward. As illustrated in FIG. 18A, in a state in which the optical transceiver has been inserted into the cage 204, a hole 201a formed in the engagement piece 201 of the cage 204 engages with the protrusion 202a of the optical transceiver, so that unintended ejection of the optical transceiver is prevented. In addition, as illustrated in FIG. 18B, when the optical transceiver is ejected from the cage 204, the engagement piece 201 is pushed out, so that the hole 201a of the engagement piece 201 and the protrusion 202a are disengaged from each other.

Here, as illustrated in FIG. 19A, it is possible to consider a configuration in which a slide member 203 having a protrusion 203a on its side slides to push out the engagement piece 201. However, in this case, as illustrated in FIG. 19B, the more the slide member 203 slides, the weaker the action pushes out the engagement piece 201. Therefore, there is concern that the engagement state cannot be canceled ultimately. Particularly, in this example, since the other end of the engagement piece 201 is curved outward, the concern becomes evident.

In order to solve the problem described above, according to an embodiment, there is provided an optical transceiver which is inserted and ejected with respect to a cage in a first direction. The optical transceiver includes a case that has a second engagement portion engaging with a first engagement portion provided in the cage to prevent the optical transceiver from being ejected from the cage, a slider that is attached to the case and moves relative to the case in the first direction, and a pusher that is oscillatably supported by the case via an oscillation shaft extending in a second direction intersecting the first direction and disengages the first engagement portion and the second engagement portion from each other by pushing the first engagement portion in a third direction intersecting the first direction and the second direction while being interlocked with a movement of the slider. The oscillation shaft is positioned in an ejecting direction with respect to an interlocking part of the slider and the pusher.

According to another embodiment, there is provided an optical transceiver insertion/ejection mechanism including a cage that extends in a first direction and has an opening at one end, and an optical transceiver that is inserted and ejected with respect to the cage through the opening. The cage has a cage main body which has a space for accommodating the optical transceiver, and a first engagement portion which extends in the first direction, of which one end on the opening side is fixed to the cage main body, of which the other end is a free end, and in which the other end is elastically displaceable in a third direction intersecting the first direction. The optical transceiver has a case which has a second engagement portion engaging with the first engagement portion to prevent the optical transceiver from being ejected from the cage, a slider which is attached to the case and moves relative to the case in the first direction, and a pusher which is oscillatably supported by the case via an oscillation shaft extending in a second direction intersecting the first direction and the third direction and disengages the first engagement portion and the second engagement portion from each other by pushing the first engagement portion in the third direction while being interlocked with a movement of the slider. The oscillation shaft is positioned in an ejecting direction with respect to an interlocking part of the slider and the pusher.

BRIEF DESCRIPTION OF THE DRAWINGS

FIG. 10 is a perspective view illustrating the appearance of a pusher according to a modification example.

DESCRIPTION OF EMBODIMENTS

Description of Embodiments of the Present Disclosure

First, embodiments of the present disclosure will be described by enumerating the contents thereof. According to an embodiment, there is provided an optical transceiver which is inserted and ejected with respect to a cage in a first direction. The optical transceiver includes a case that has a second engagement portion engaging with a first engagement portion provided in the cage to prevent the optical transceiver from being ejected from the cage, a slider that is attached to the case and moves relative to the case in the first direction, and a pusher that is oscillatably supported by the case via an oscillation shaft extending in a second direction intersecting the first direction and disengages the first engagement portion and the second engagement portion from each other by pushing the first engagement portion in a third direction intersecting the first direction and the second direction while being interlocked with a movement of the slider. The oscillation shaft is positioned in an ejecting direction with respect to an interlocking part of the slider and the pusher.

Figure 19A:
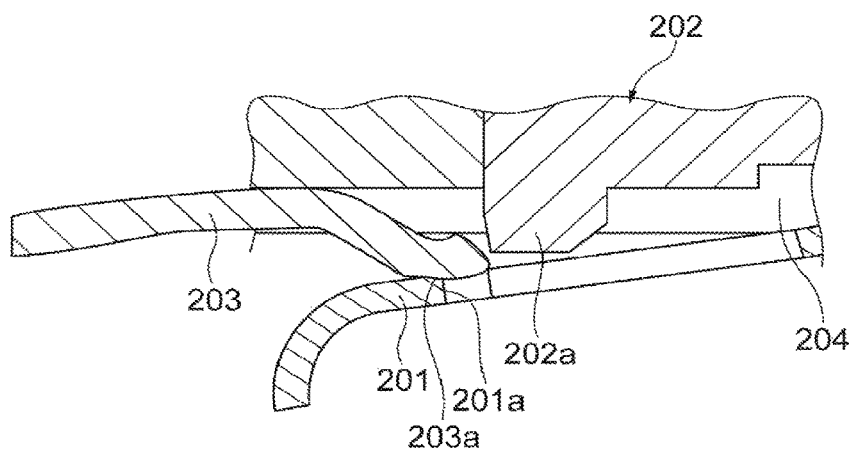
FIGS. 19A and 19B are views illustrating a specific example of the optical transceiver insertion/ejection mechanism illustrated in FIGS. 18A and 18B.
Figure 19B:
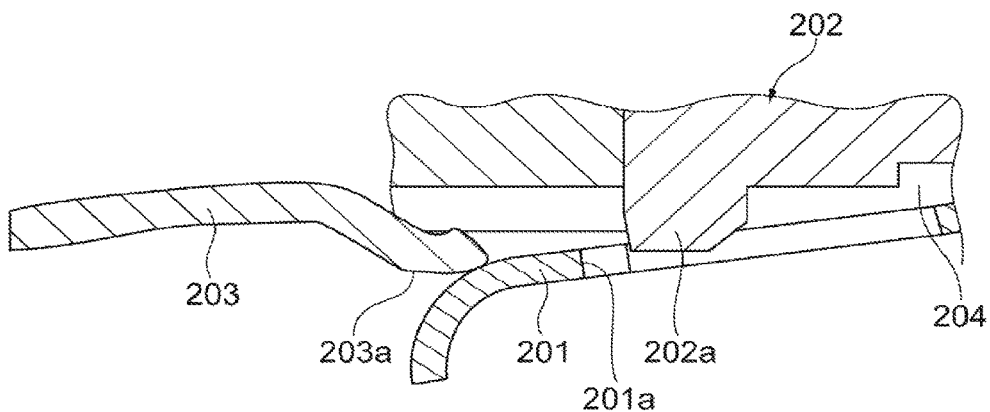

When the optical transceiver is ejected from the cage, for example, a pull-tab fixed to the slider is pulled, so that the slider moves relative to the case. Then, the pusher oscillates around the oscillation shaft while being interlocked with a movement of the slider. Accordingly, the pusher pushes the first engagement portion to disengage the first engagement portion and the second engagement portion from each other. Moreover, in this optical transceiver, the oscillation shaft is positioned in the ejecting direction with respect to the interlocking part of the slider and the pusher. Therefore, the further the slider moves in the ejecting direction, the stronger the action of the pusher pushes the first engagement portion. Thus, according to the optical transceiver, compared to the configuration illustrated in FIGS. 19A and 19B, it is possible to more reliably cancel an engagement state between the optical transceiver and the cage.

The optical transceiver may further include the pull-tab that is fixed to the slider. In this case, a worker can easily move the slider by pulling the pull-tab.

In the optical transceiver, a mechanism causing the pusher to oscillate while being interlocked with a movement of the slider may have an inclined surface which is provided in one of the slider and the pusher and is inclined with respect to the first direction, and a contact portion which is provided in the other of the slider and the pusher and comes into contact with the inclined surface. In this case, when the slider moves, the contact portion relatively moves along the inclined surface while coming into contact with the inclined surface. Therefore, the pusher can easily oscillate while being interlocked with a movement of the slider.

In the optical transceiver, the pusher may have a projected shape which is projected toward the slider and includes the contact portion, and the slider may have a recessed shape which includes the inclined surface and follows the projected shape. Accordingly, it is possible to reduce the volume of a space occupied by the slider and the pusher, which can contribute to miniaturization of the optical transceiver.

In the optical transceiver, the oscillation shaft and the interlocking part may be positioned in a substantial center portion of the pusher in the second direction. In this case, since a fulcrum and a power point of the pusher are arranged in the substantial center portion of the pusher, distortion of the pusher at the time of oscillation can be suppressed.

In the optical transceiver, a distance between a position at which the pusher pushes the first engagement portion, and the oscillation shaft may be longer than a distance between the interlocking part and the oscillation shaft. In this case, compared to an oscillation distance of the interlocking part of the pusher, an oscillation distance in a position of pushing the first engagement portion becomes long. Therefore, the pusher can efficiently push the first engagement portion.

The optical transceiver may further include an elastic member that is fixed to the case and biases the slider in an inserting direction. In this case, the slider after movement can easily return to an original position.

In the optical transceiver, the second engagement portion may have a first protrusion protruding in the third direction from the case, and the first protrusion may engage with an opening portion of the first engagement portion. For example, due to such a configuration, the second engagement portion can prevent the optical transceiver from being ejected from the cage by engaging with the first engagement portion. Then, in this case, the pusher may have a second protrusion, and the second protrusion may disengage the first engagement portion and the second engagement portion by pushing an inner edge of the opening portion. Moreover, the first protrusion may have a groove extending in the third direction on an engagement surface with respect to the opening portion, and the second protrusion of the pusher may move inside the groove in the third direction. Accordingly, it is possible to prevent the inner edge of the opening portion from being caught by (stuck in) the first protrusion and to more reliably cancel an engagement state between the first engagement portion and the second engagement portion.

According to another embodiment, there is provided an optical transceiver insertion/ejection mechanism including a cage that extends in a first direction and has an opening at one end, and an optical transceiver that is inserted and ejected with respect to the cage through the opening. The cage has a cage main body which has a space for accommodating the optical transceiver, and a first engagement portion which extends in the first direction, of which one end on the opening side is fixed to the cage main body, of which the other end is a free end, and in which the other end is elastically displaceable in a third direction intersecting the first direction. The optical transceiver has a case which has a second engagement portion engaging with the first engagement portion to prevent the optical transceiver from being ejected from the cage, a slider which is attached to the case and moves relative to the case in the first direction, and a pusher which is oscillatably supported by the case via an oscillation shaft extending in a second direction intersecting the first direction and the third direction and disengages the first engagement portion and the second engagement portion from each other by pushing the first engagement portion in the third direction while being interlocked with a movement of the slider. The oscillation shaft is positioned in an ejecting direction with respect to an interlocking part of the slider and the pusher. According to the optical transceiver insertion/ejection mechanism, similar to the optical transceiver described above, it is possible to more reliably cancel an engagement state between the optical transceiver and the cage.

Details of Embodiments of the Present Disclosure

Specific examples of an optical transceiver and an optical transceiver insertion/ejection mechanism according to embodiments of the present disclosure will be described below with reference to the drawings. The present disclosure is not limited to the examples, and it is intended that the present disclosure includes those disclosed in the aspects of the disclosure, the meaning equivalent to the aspects of the disclosure, and all the changes within the scope. In description below, the same reference signs are applied to the same elements in description of the drawings, and duplicated description will be omitted.

Figure 1:
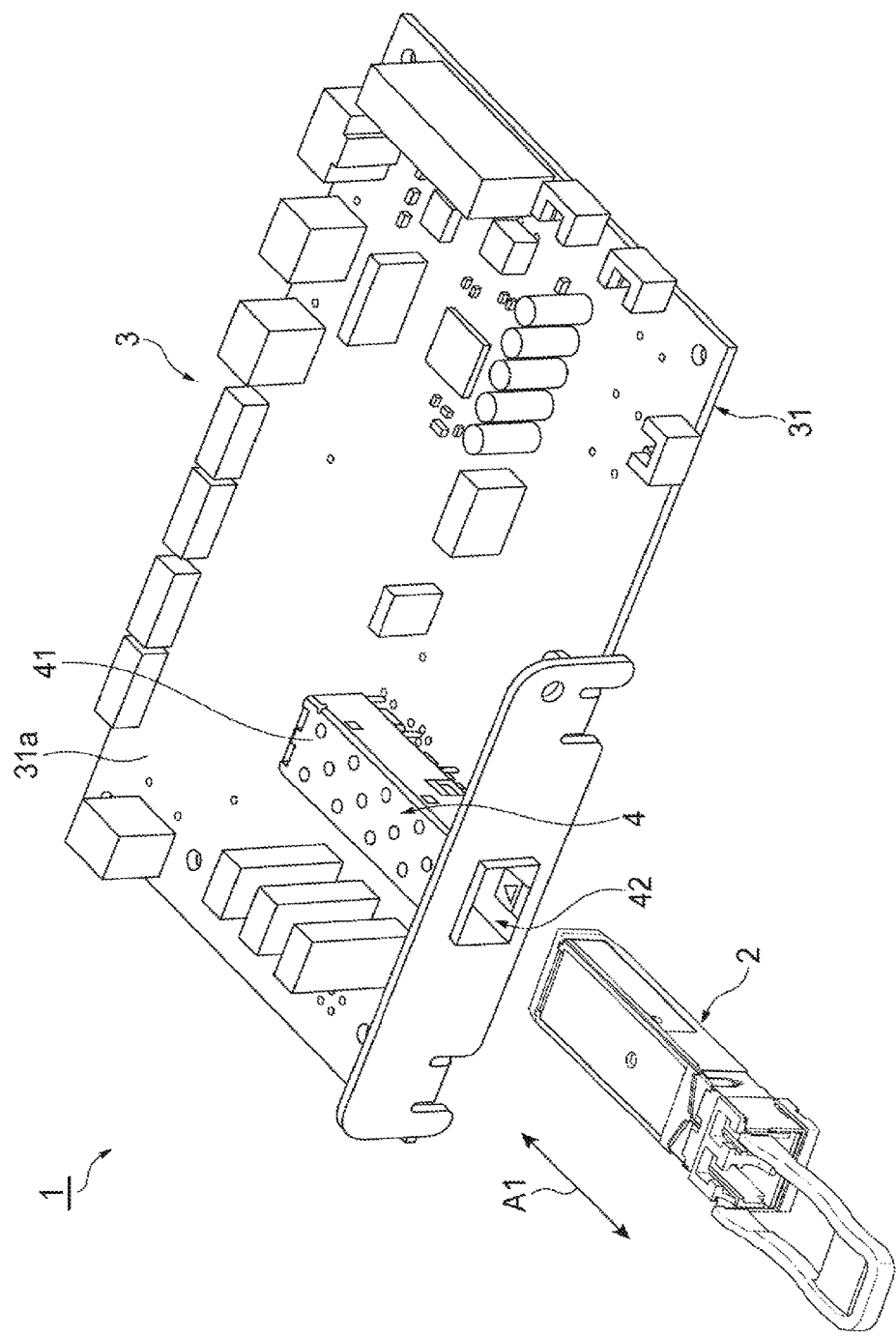
FIG. 1 is a perspective view illustrating a configuration of an optical transceiver insertion/ejection mechanism according to an embodiment.

FIG. 1 is a perspective view illustrating a configuration of an optical transceiver insertion/ejection mechanism 1 according to the present embodiment. As illustrated in FIG. 1, the optical transceiver insertion/ejection mechanism 1 includes an optical transceiver 2, and a cage 4 provided in a host device 3. The host device 3 has a printed circuit board 31, and a number of electronic components are mounted on a mounting surface 31a of the printed circuit board 31. The cage 4 is also mounted on the mounting surface 31a. The cage 4 has a cage main body 41 extending in an insertion/ejection direction (first direction) A1. For example, the cage main body 41 has a rectangular cross-sectional shape perpendicular to the insertion/ejection direction A1. The cage main body 41 has a space for accommodating the optical transceiver 2. In addition, the cage main body 41 has an opening 42 at one end of the space in the insertion/ejection direction A1. The opening 42 is positioned at an edge of the printed circuit board 31 outward from the printed circuit board 31. For example, the cage 4 is made of metal. In description below, a direction toward an end portion on a side opposite to the opening 42 of the cage 4 will be referred to as "forward" and a direction toward the opening 42 of the cage 4 will be referred to as "rearward" sometimes.

Figure 2:
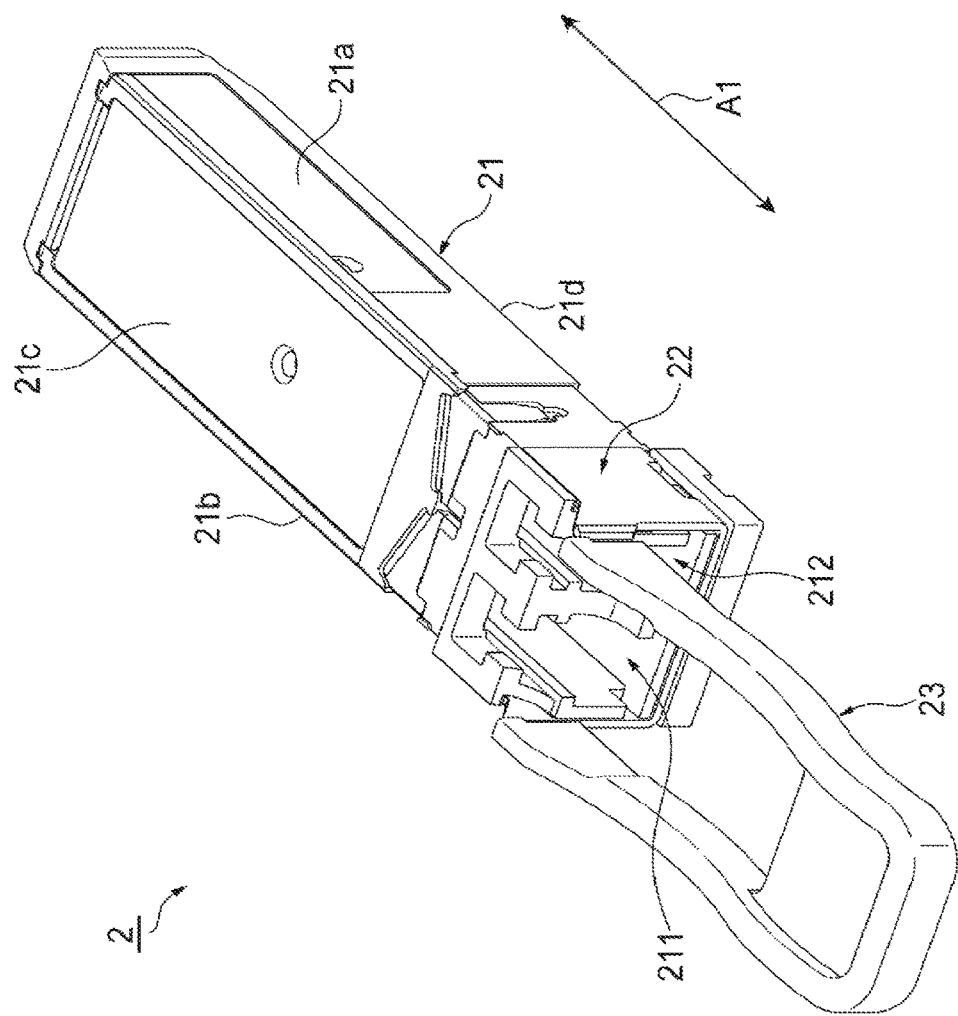
FIG. 2 is a perspective view illustrating the appearance of an optical transceiver.

The optical transceiver 2 performs full duplex bi-directional optical communication in conformity with the SFP standards. The optical transceiver 2 is inserted and ejected with respect to the cage main body 41 of the cage 4 through the opening 42 in the insertion/ejection direction A1. FIG. 2 is a perspective view illustrating the appearance of the optical transceiver 2. As illustrated in FIG. 2, the optical transceiver 2 includes a case 21, a slider 22, and a pull-tab 23. The case 21 is a slender metal member extending along the insertion/ejection direction A1. For example, the case 21 has a rectangular cross-sectional shape perpendicular to the insertion/ejection direction A1. The case 21 has a pair of side surfaces 21a and 21b extending in the insertion/ejection direction A1, an upper surface 21c, and a bottom surface 21d. In addition, at one end in the insertion/ejection direction A1, the case 21 accommodates a pair of optical receptacles 211 and 212 joined to an optical connector provided at a tip of an optical fiber. Moreover, at the other end in the insertion/ejection direction A1, the case 21 accommodates an electric connector connected to an electric connector provided inside the cage 4. In description below, a direction toward one end of the optical transceiver 2 on the electric connector side will be referred to as "forward" and a direction toward one end on the optical receptacles 211 and 212 side will be referred to as "rearward" sometimes.

The slider 22 is a member which is attached to the case 21 and moves relative to the case 21 in the insertion/ejection direction A1. For example, the slider 22 is made of metal and is provided at a rear end-sided position in the case 21. The slider 22 surrounds three sides of a rectangular cross section of the case 21 and is formed by bending a plate-shaped member.

The pull-tab 23 is a substantially U-shaped member fixed to the slider 22. For example, the pull-tab 23 is made of resin. The pull-tab 23 is configured to be formed of a material softer than the case 21 (for example, resin). The substantially U-shaped pull-tab 23 and the slider 22 are joined to each other and are configured to form a ring. A worker can pull the pull-tab 23 in an ejecting direction by inserting his/her fingers into the ring. The pull-tab 23 need only be able to be pinched or the like by a worker and be pulled out in the ejecting direction, and its shape is not limited to a substantial U-shape.

Figure 3:
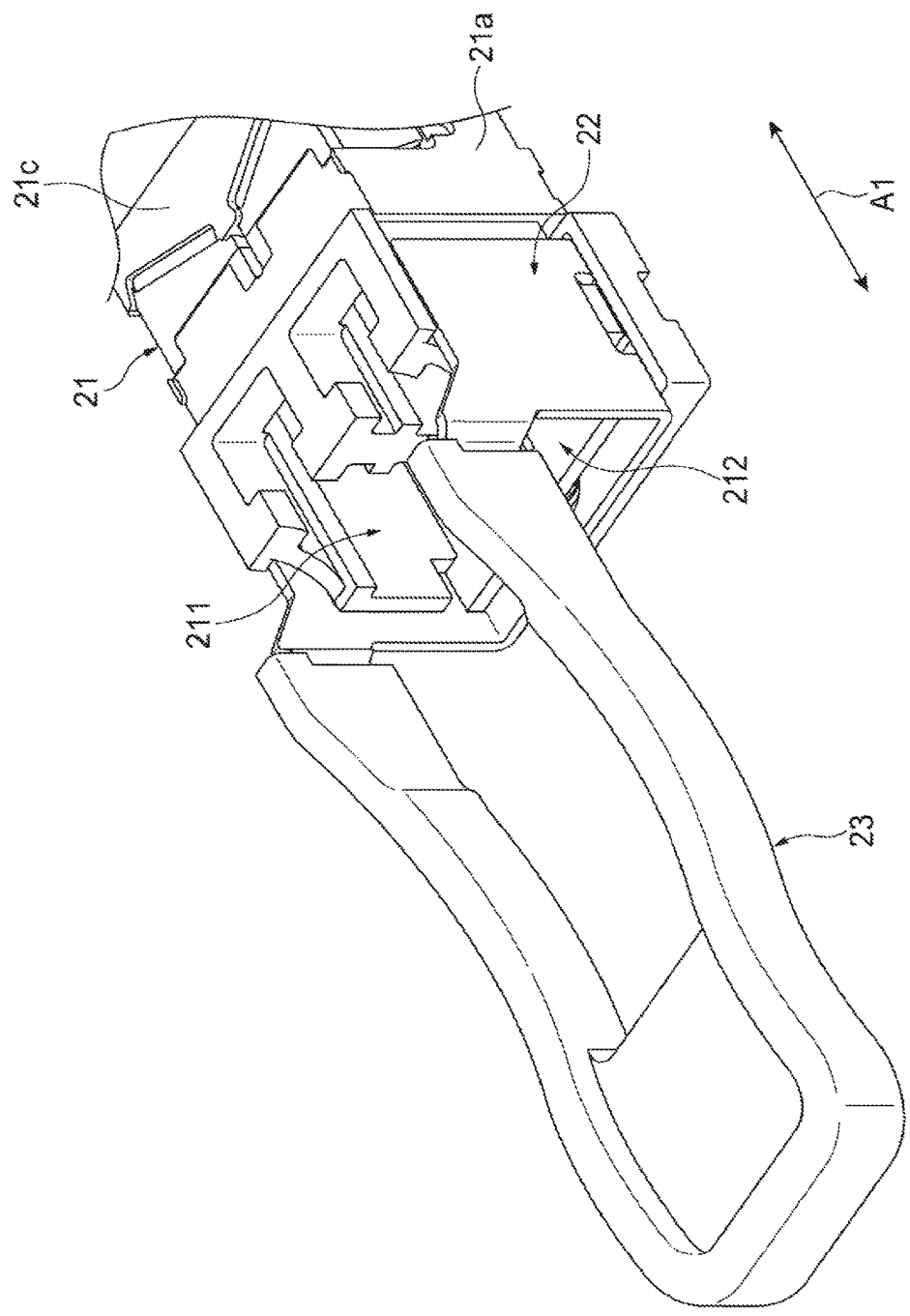
FIG. 3 is a perspective view illustrating a state in which a pull-tab is pulled in an ejecting direction.

FIG. 3 is a perspective view illustrating a state in which the pull-tab 23 is pulled in the ejecting direction. As illustrated in FIG. 3, when the pull-tab 23 is pulled in the ejecting direction, a force applied to the pull-tab 23 is transmitted to the slider 22, and the slider 22 moves rearward relative to the case 21. If a force of pulling the pull-tab 23 is removed, the slider 22 automatically and moves forward relative to the case 21 due to action of an elastic member (will be described below) and returns to an original position.

Figure 4:
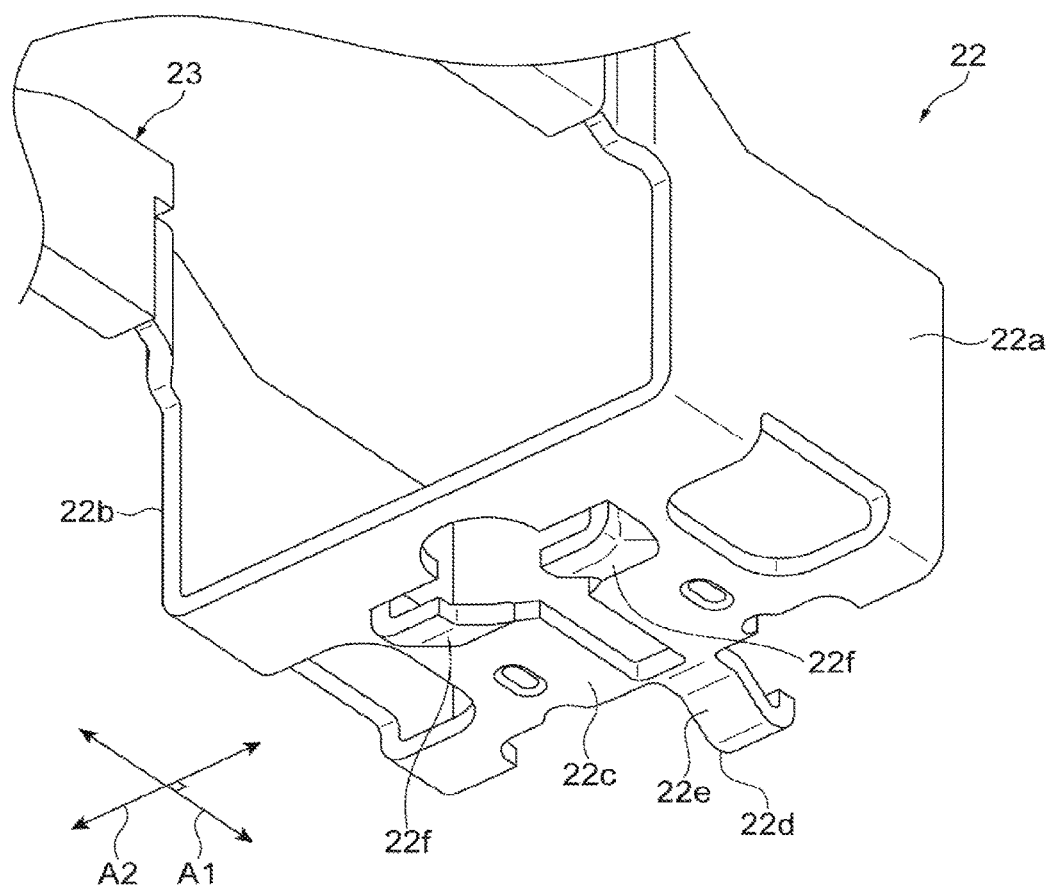
FIG. 4 is an enlarged perspective view illustrating a slider.

FIG. 4 is an enlarged perspective view illustrating the slider 22. As illustrated in FIG. 4, the slider 22 has a pair of side plates 22a and 22b, and a bottom plate 22c connecting the side plates 22a and 22b to each other. The side plates 22a and 22b are positioned on the side surfaces 21a and 21b of the case 21 and extend along the side surfaces 21a and 21b respectively. The bottom plate 22c is positioned on the bottom surface 21d of the case 21 and extends along the bottom surface 21d. A protrusion 22d extending in the insertion/ejection direction A1 protrudes forward from a forward end edge of the bottom plate 22c (that is, an end edge of the bottom plate 22c on the other end side of the case 21). The protrusion 22d has a shape of a flat plate bent outward from the optical transceiver 2, and an inclined surface 22e is provided on its outer surface. The inclined surface 22e is inclined with respect to the insertion/ejection direction A1 to be gradually separated from the case 21 while being separated from the bottom plate 22c. In addition, a pair of inclined surfaces 22f arranged in a direction A2 (second direction) intersecting (for example, orthogonal to) the insertion/ejection direction A1 is provided in the bottom plate 22c of the slider 22. The inclined surfaces 22f are inclined with respect to the insertion/ejection direction A1 to gradually approach the case 21 while approaching the protrusion 22d.

Figure 5:
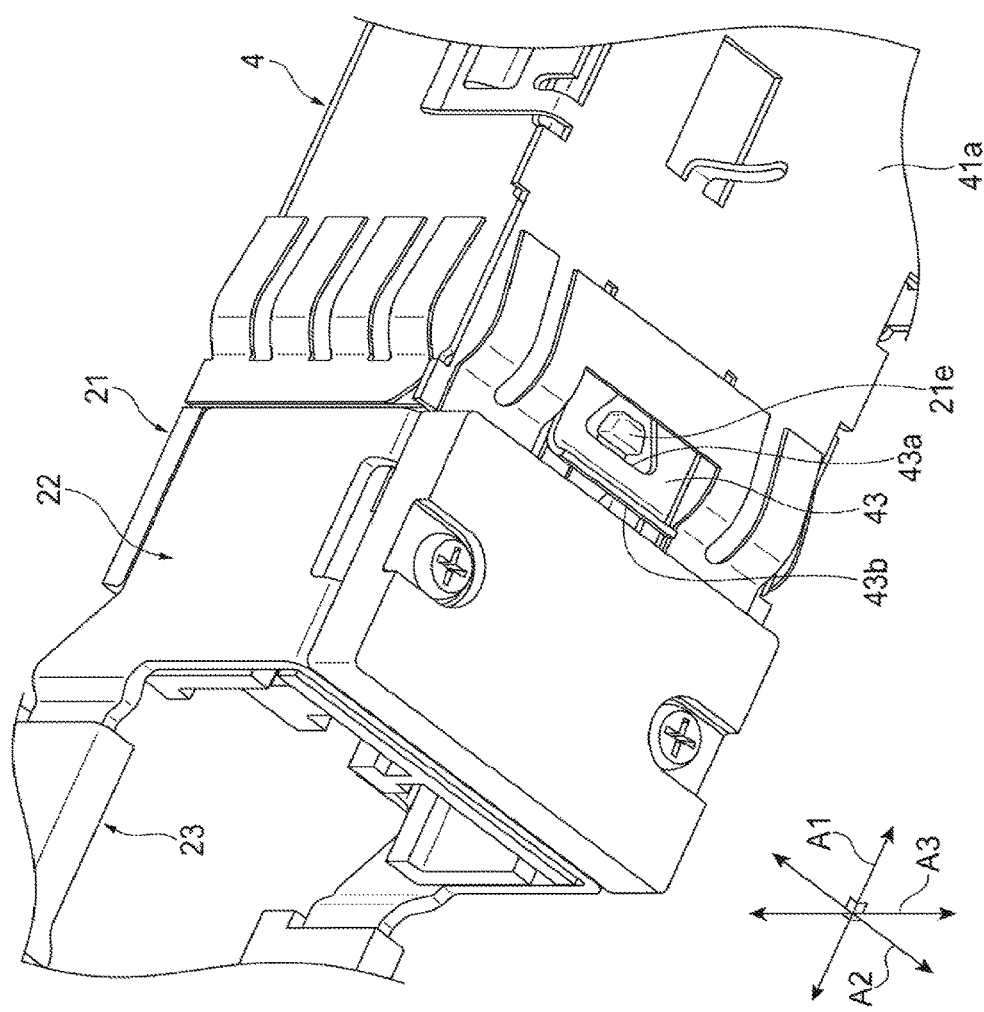
FIG. 5 is a detailed perspective view illustrating a configuration in the vicinity of a bottom plate of a main body portion of a cage in a state in which the optical transceiver is inserted.

FIG. 5 is a detailed perspective view illustrating a configuration in the vicinity of a bottom plate 41a of the cage main body 41 in a state in which the optical transceiver 2 is inserted. The bottom plate 41a is a part facing the mounting surface 31a of the printed circuit board 31 in FIG. 1. As illustrated in FIG. 5, a plate-shaped tab 43 is provided in the bottom plate 41a of the cage 4. The tab 43 is a first engagement portion in the present embodiment. The tab 43 is positioned in front of the slider 22. The tab 43 extends in the insertion/ejection direction A1. The front end of the tab 43 is connected to the bottom plate 41a, and the rear end of the tab 43 is a free end. The rear end of the tab 43 can be elastically warped in a direction A3 intersecting (for example, orthogonal to) both the insertion/ejection direction A1 and the direction A2. In addition, the tab 43 has an opening portion 43a for engaging with a protrusion 21e protruding in the direction A3 from the bottom surface 21d of the case 21. The protrusion 21e is a first protrusion of a second engagement portion in the present embodiment, and the protrusion 21e prevents the optical transceiver 2 from being ejected from the cage 4 by engaging with the tab 43 of the cage 4. The rear end of the tab 43 forms a curved portion 43b curved outward from the cage 4 such that the tab 43 is prevented from interfering with the protrusion 21e when the optical transceiver 2 is inserted into the cage 4, while tab 43 is warped outward from the cage 4 and the protrusion 21e is accommodated in the opening portion 43a.

Figure 6A:
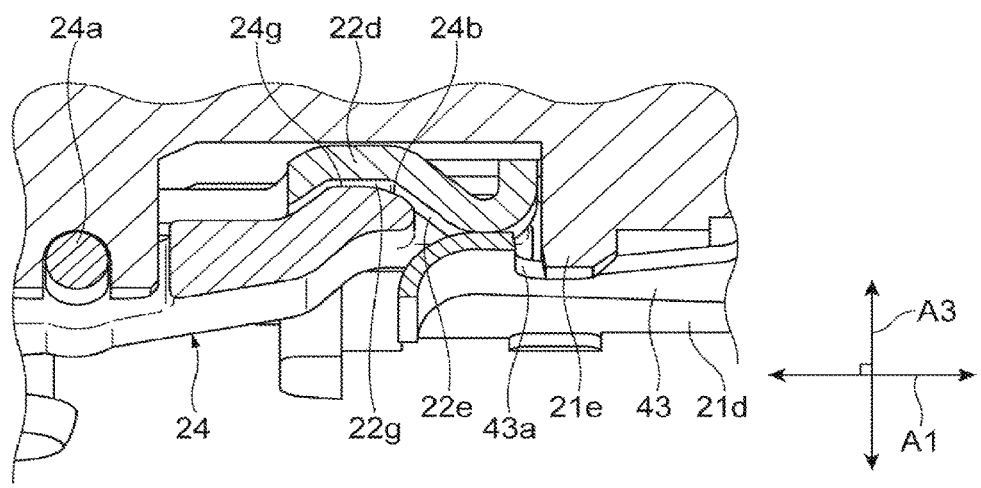
FIGS. 6A and 6B are detailed perspective cross-sectional views illustrating a configuration of a case in the vicinity of a tab.
Figure 6B:
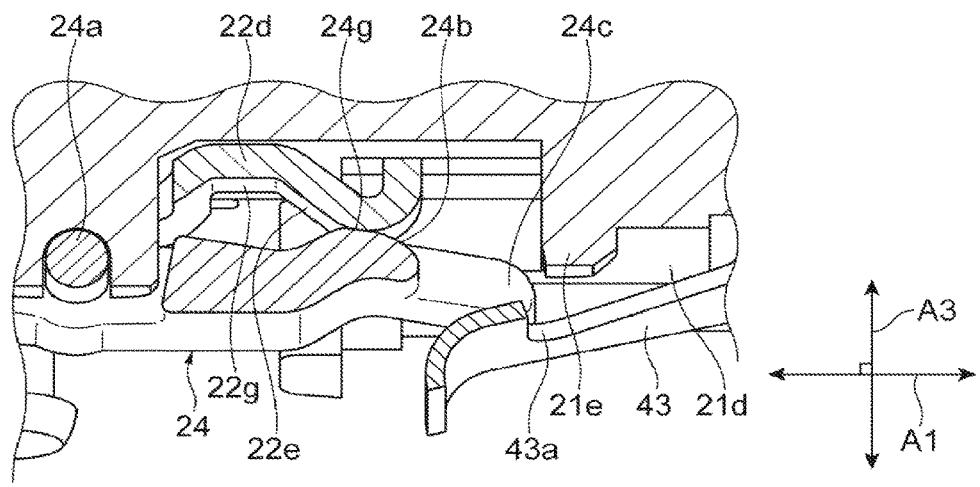

FIGS. 6A and 6B are detailed perspective cross-sectional views illustrating a configuration of the case 21 in the vicinity of the tab 43. As illustrated in FIGS. 6A and 6B, the optical transceiver 2 of the present embodiment further includes a pusher 24. The pusher 24 is oscillatably supported by the case 21 via an oscillation shaft 24a extending in the direction A2. The pusher 24 oscillates around the oscillation shaft 24a while being interlocked with a movement of the slider 22. FIG. 6A illustrates a state before oscillation, and FIG. 6B illustrates a state after oscillation. As illustrated in FIG. 6B, the pusher 24 oscillates to push the tab 43 in the direction A3, so that the tab 43 is warped outward from the cage 4, and the tab 43 and the protrusion 21e are disengaged from each other.

Figure 7:
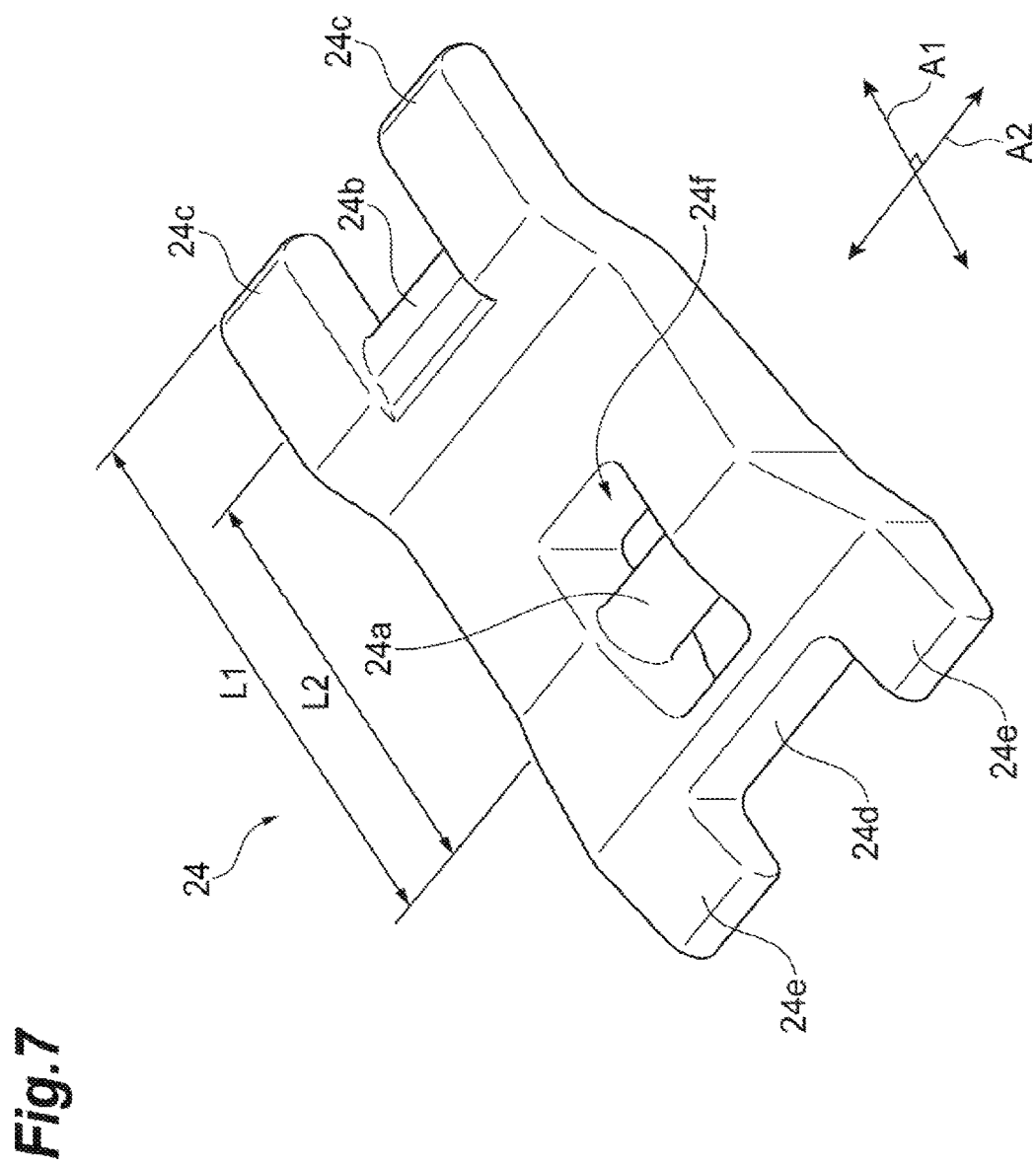
FIG. 7 is a perspective view illustrating the appearance of a pusher.

FIG. 7 is a perspective view illustrating the appearance of the pusher 24. As illustrated in FIG. 7, the pusher 24 exhibits a plate shape extending in the insertion/ejection direction A1 and the direction A2. The oscillation shaft 24a is provided in a rear end-sided part of the pusher 24 and is positioned in a substantial center portion of the pusher 24 in the direction A2. The oscillation shaft 24a is hung between side surfaces of an opening portion 24f formed in the pusher 24. Accordingly, a space for accommodating a mechanism on the case 21 side supporting the oscillation shaft 24a is provided in the front and the rear of the oscillation shaft 24a.

The pusher 24 further includes a contact portion 24b. The contact portion 24b is a part being interlocked with a movement of the slider 22. The contact portion 24b is provided in front of the oscillation shaft 24a and is positioned in a substantial center portion of the pusher 24 in the direction A2. As illustrated in FIGS. 6A and 6B, the contact portion 24b comes into contact with the inclined surface 22e of the slider 22 when the slider 22 moves. Then, the contact portion 24b is pushed out to the inclined surface 22e in response to the inclined surface 22e moving rearward (in the ejecting direction) and gradually moves outward in the direction A3.

The pusher 24 further includes pressing portions 24c. As illustrated in FIGS. 6A and 6B, the pressing portions 24c are parts pushing the tab 43 outward when the pusher 24 oscillates. In the present embodiment, the pusher 24 has a pair of pressing portions 24c, and the pair of pressing portions 24c is disposed side by side in the direction A2 while having the contact portion 24b interposed therebetween. In addition, the pair of pressing portions 24c protrudes forward with respect to the contact portion 24b. In other words, the contact portion 24b is configured to form a recess portion with respect to the pair of pressing portions 24c. Therefore, a distance L1 between the pressing portions 24c and the oscillation shaft 24a in the insertion/ejection direction A1 is longer than a distance L2 between the contact portion 24b and the oscillation shaft 24a in the same direction.

In addition, as illustrated in FIGS. 6A and 6B, the pusher 24 of the present embodiment further has a projected part 24g. The projected part 24g is projected toward the protrusion 22d of the slider 22 and includes the contact portion 24b. In addition, the protrusion 22d of the slider 22 further has a recessed part 22g. The recessed part 22g is recessed toward the bottom surface 21d of the case 21 and includes the inclined surface 22e. The surface of the recessed part 22g is formed into a shape following the surface of the projected part 24g. In other words, the surface of the projected part 24g is curved along the surface of the projected part 24g. Accordingly, the projected part 24g is accommodated in the recessed part 22g in a state in which the tab 43 and the protrusion 21e engage with each other.

Figure 8A:
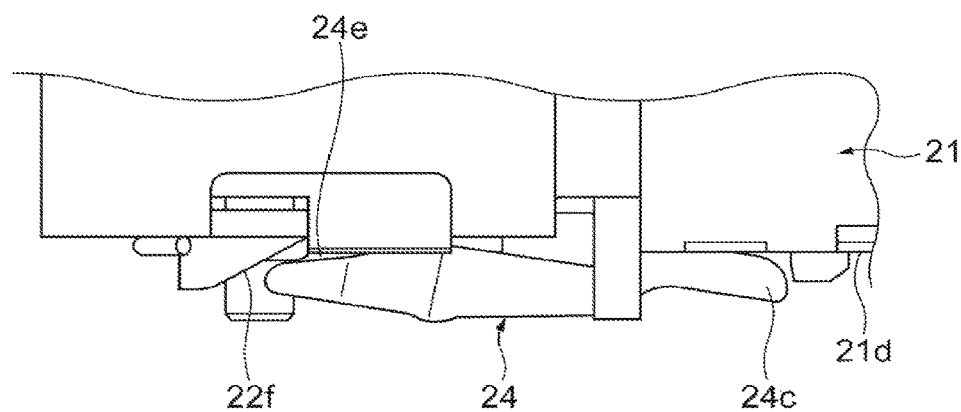
FIGS. 8A and 8B are side views illustrating an operation of the pusher.
Figure 8B:
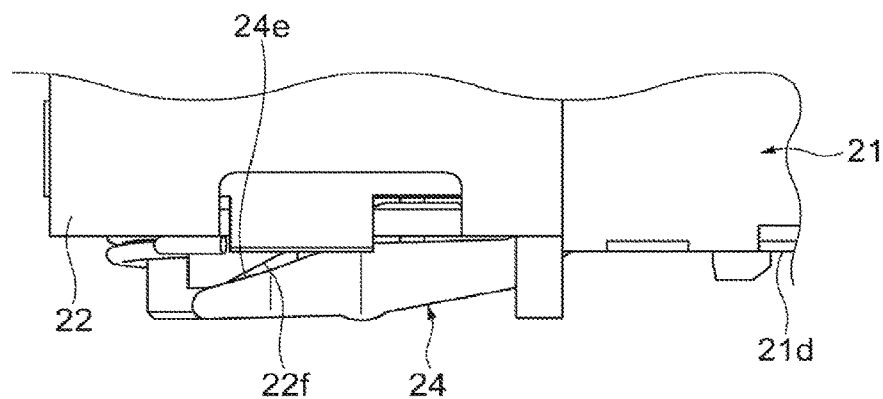

As illustrated in FIG. 7, the pusher 24 further has a pair of contact portions 24e arranged in the direction A2, and a recess portion 24d formed between the pair of contact portions 24e. The pair of contact portions 24e and the recess portion 24d are formed in the rear end portion of the pusher 24. FIGS. 8A and 8B are side views illustrating an operation of the pusher 24 by the pair of contact portions 24e. FIG. 8A illustrates a state in which the pull-tab 23 is pulled in the ejecting direction and the slider 22 moves rearward. FIG. 8B illustrates a state in which a force of pulling the pull-tab 23 is removed, and the slider 22 has moved forward and has returned to the original position. As described above, when the slider 22 moves rearward, the pusher 24 oscillates and the pressing portions 24c move outward (FIG. 8A). In this case, the contact portions 24e of the pusher 24 are separated from the inclined surfaces 22f provided in the bottom plate 22c of the slider 22. Then, as illustrated in FIG. 8B, when the slider 22 moves forward and returns to the original position, the inclined surfaces 22f come into contact with the contact portions 24e, and when the slider 22 further moves forward, the inclined surfaces 22f push the contact portions 24e outward. Accordingly, an angular position around the oscillation shaft 24a of the pusher 24 returns to a state before oscillation. A recess portion for accommodating the pressing portions 24c is formed on the bottom surface 21d of the case 21. When the angular position of the pusher 24 returns to a state before oscillation, the pressing portions 24c are accommodated in the recess portion.

Figure 9A:
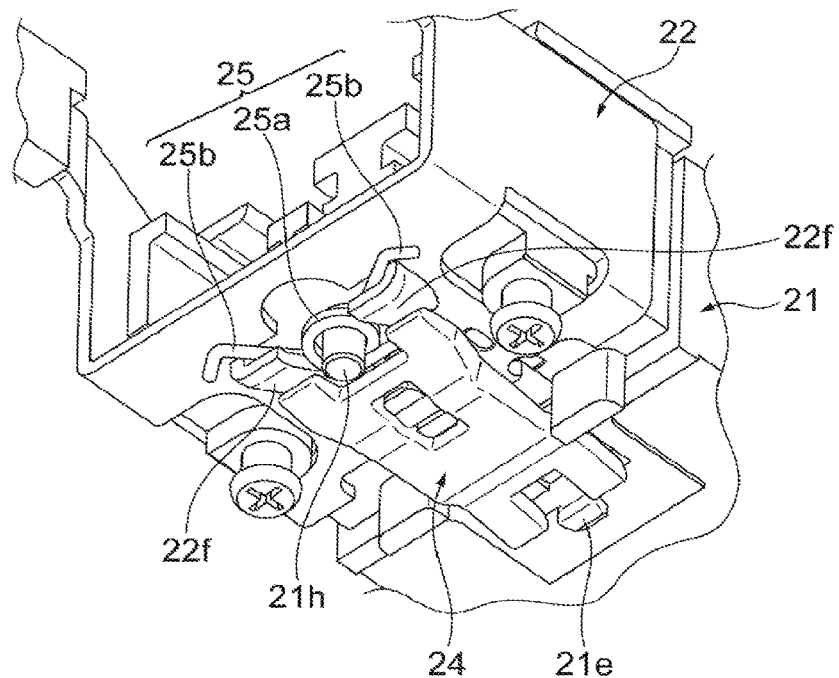
FIGS. 9A and 9B are perspective views illustrating an elastic member for automatically moving the slider forward.
Figure 9B:
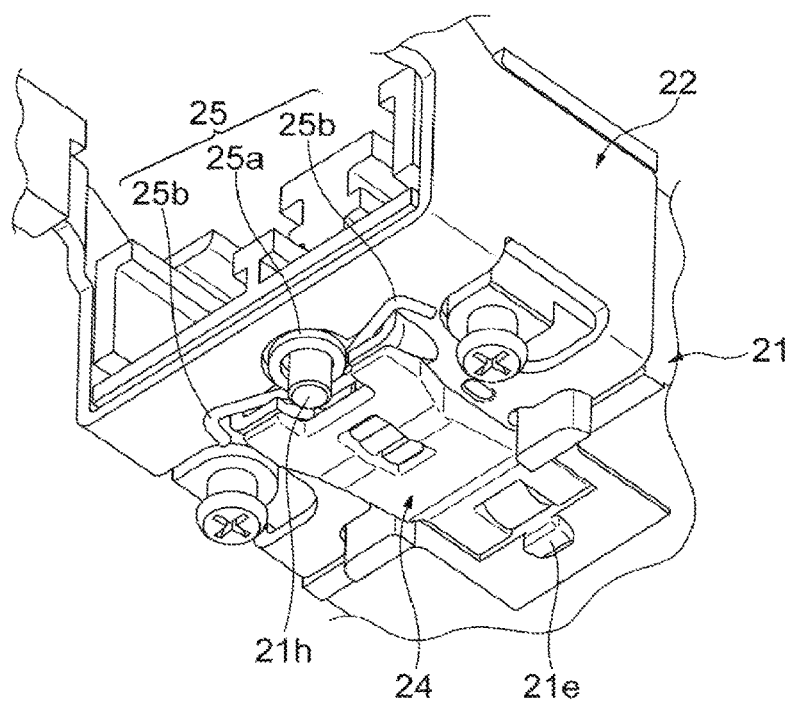

As described above, when a force of pulling the pull-tab 23 is removed, the slider 22 automatically moves forward and returns to the original position. FIGS. 9A and 9B are perspective views illustrating an elastic member 25 for automatically moving the slider 22 forward. FIG. 9A illustrates a state in which the pull-tab 23 is pulled in the ejecting direction and the slider 22 has moved rearward. FIG. 9B illustrates a state in which a force of pulling the pull-tab 23 is removed, and the slider 22 has moved forward and has returned to the original position. As illustrated in the diagrams, the elastic member 25 of the present embodiment has a shape of a so-called torsion spring and has a coiled part 25a and a pair of end portions 25b which protrude in directions opposite to each other from both ends of the coiled part 25a. The coiled part 25a is inserted through a shaft 21h protruding from the bottom surface 21d of the case 21, thereby being fixed to the case 21. In addition, the pair of end portions 25b engages with a pair of protrusion parts configuring the pair of inclined surfaces 22f of the slider 22 respectively. Accordingly, the pair of end portions 25b biases the slider 22 in an inserting direction (forward).

Effects obtained by the optical transceiver insertion/ejection mechanism 1 and the optical transceiver 2 according to the above-described present embodiment will be described. As described above, when the optical transceiver 2 is ejected from the cage 4, for example, the pull-tab 23 fixed to the slider 22 is pulled, so that the slider 22 moves relative to the case 21. Then, the pusher 24 oscillates around the oscillation shaft 24a while being interlocked with a movement of the slider 22. Accordingly, the pusher 24 pushes the tab 43 and disengages the tab 43 and the protrusion 21e from each other. Moreover, in the optical transceiver 2 of the present embodiment, the oscillation shaft 24a is positioned in the rear (in the ejecting direction) with respect to the interlocking part (contact portion 24b) between the slider 22 and the pusher 24. Therefore, the further the slider 22 moves rearward (in the ejecting direction), the stronger the action of the pusher 24 pushes the tab 43. Thus, according to the optical transceiver 2, compared to the configuration illustrated in FIGS. 19A and 19B, it is possible to more reliably cancel an engagement state between the optical transceiver 2 and the cage 4.

In addition, as in the present embodiment, the optical transceiver 2 may further include the pull-tab 23 which is fixed to the slider 22. In this case, a worker can easily move the slider 22 by pulling the pull-tab 23.

In addition, as in the present embodiment, the mechanism causing the pusher 24 to oscillate while being interlocked with a movement of the slider 22 may have the inclined surface 22e which is provided in the slider 22 and is inclined with respect to the insertion/ejection direction A1, and the contact portion 24b which is provided in the pusher 24 and comes into contact with the inclined surface 22e. In this case, when the slider 22 moves, the contact portion 24b relatively moves along the inclined surface 22e while coming into contact with the inclined surface 22e (refer to FIGS. 6A and 6B). Therefore, the pusher 24 can easily oscillate while being interlocked with a movement of the slider 22.

In the mechanism causing the pusher 24 to oscillate while being interlocked with a movement of the slider 22, an inclined surface which is inclined with respect to the insertion/ejection direction A1 may be provided in the pusher 24, and a contact portion which comes into contact with the inclined surface may be provided in the slider 22. Even in this case as well, the pusher 24 can easily oscillate while being interlocked with a movement of the slider 22.

In addition, as in the present embodiment, the pusher 24 may have the projected part 24g which is projected toward the slider 22 and includes the contact portion 24b, and the slider 22 may have the recessed part 22g which includes the inclined surface 22e and follows the projected part 24g. Accordingly, it is possible to reduce the volume of a space occupied by the slider 22 and the pusher 24, which can contribute to miniaturization of the optical transceiver 2. In addition, the pusher 24 can be easily accommodated in the recess portion of the case 21 (FIG. 8B).

In addition, as in the present embodiment, the oscillation shaft 24a and the contact portion 24b may be positioned in the substantial center portion of the pusher 24 in the direction A2. In this case, since a fulcrum and a power point of the pusher 24 are arranged in the substantial center portion of the pusher 24, distortion of the pusher 24 at the time of oscillation can be suppressed, and the pusher 24 can smoothly oscillate.

In addition, as in the present embodiment, the distance L1 between a position (pressing portion 24c) at which the pusher 24 pushes the tab 43, and the oscillation shaft 24a may be longer than the distance L2 between the contact portion 24b and the oscillation shaft 24a. In this case, compared to an oscillation distance of the contact portion 24b, an oscillation distance in a position (pressing portion 24c) of pushing the tab 43 becomes long. Therefore, the pusher 24 can efficiently push the tab 43.

In addition, as in the present embodiment, the optical transceiver 2 may further include the elastic member 25 that is fixed to the case 21 and biases the slider 22 in the inserting direction. In this case, the slider 22 after movement can easily (automatically) return to the original position.

Modification Example

Figure 11:
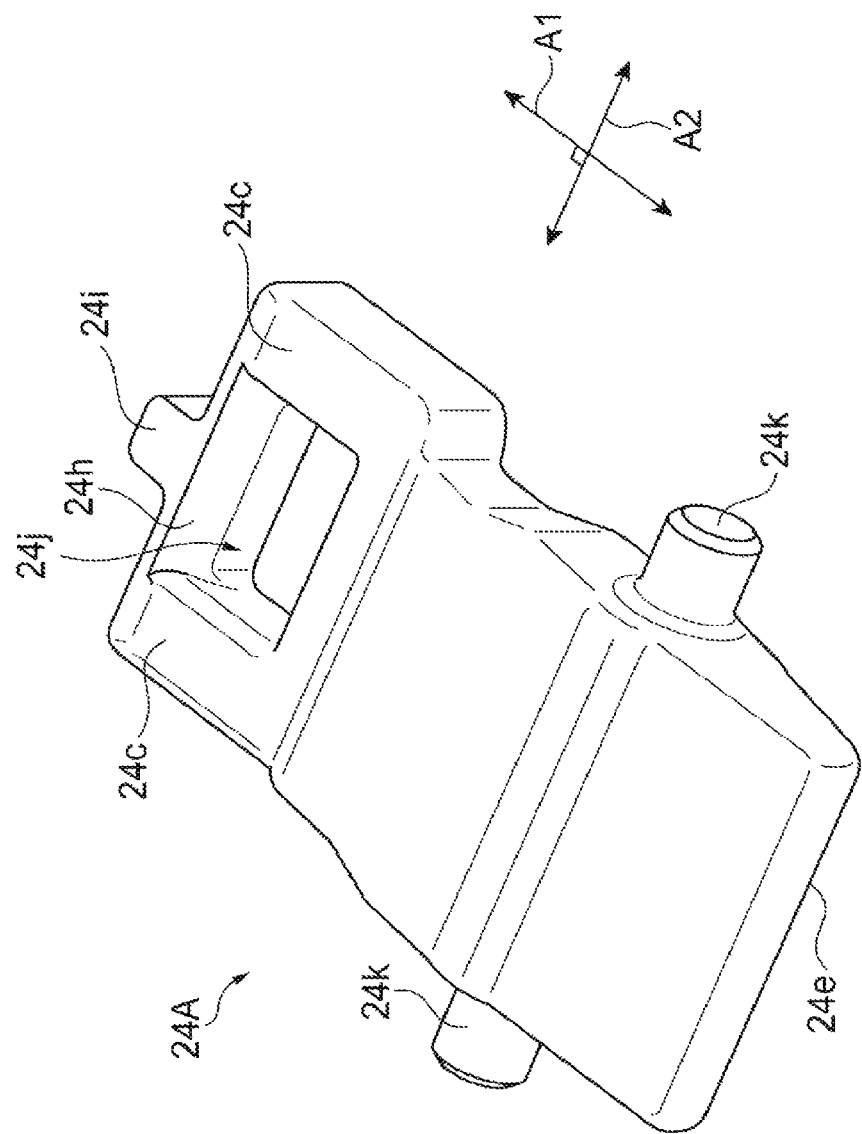
FIG. 11 is a perspective view illustrating the appearance of the pusher according to the modification example.

FIGS. 10 and 11 are perspective views illustrating the appearance of a pusher 24A according to a modification example of the embodiment. FIG. 10 illustrates the appearance of the pusher 24A seen from the case 21 side, and FIG. 11 illustrates the appearance of the pusher 24A seen from the opposite side of the case 21. The pusher 24A according to the present modification example is different from the pusher 24 of the above-described embodiment in the following points.

The pusher 24A of the present modification example has a coupling portion 24h connecting tips of the pair of pressing portions 24c to each other. The coupling portion 24h extends in the direction A2 at the front end of the pusher 24A. As a result, an opening 24j enclosed by the pair of pressing portions 24c, the coupling portion 24h, and the contact portion 24b is formed in the pusher 24A. For example, the opening 24j has a rectangular plane shape. Then, a protrusion 24i is provided on the side surface of the coupling portion 24h on a side opposite to the opening 24j. The protrusion 24i is a second protrusion in the present embodiment and protrudes forward from a central part of the coupling portion 24h (that is, an intermediate portion of the pair of pressing portions 24c). In addition, in place of the oscillation shaft 24a included in the pusher 24 in the above-described embodiment, the pusher 24A of the present modification example has a pair of columnar oscillation shafts 24k. The pair of oscillation shafts 24k is provided in a rear end-sided part of the pusher 24A and protrudes in the direction A2 from both side surfaces of the pusher 24 in the direction A2. The opening portion 24f included in the pusher 24 in the above-described embodiment (refer to FIG. 7) is not provided in the pusher 24A of the present modification example. The pusher 24A is oscillatably supported by the case 21 via the pair of oscillation shafts 24k. Due to action similar to that of the pusher 24 in the above-described embodiment, the pusher 24A oscillates around the oscillation shafts 24k while being interlocked with a movement of the slider 22. The pusher 24A of the present modification example does not have the recess portion 24d included in the pusher 24 in the above-described embodiment (refer to FIG. 7). The rear end portion of the pusher 24A (contact portion 24e) linearly extends in the direction A2.

Figure 12:
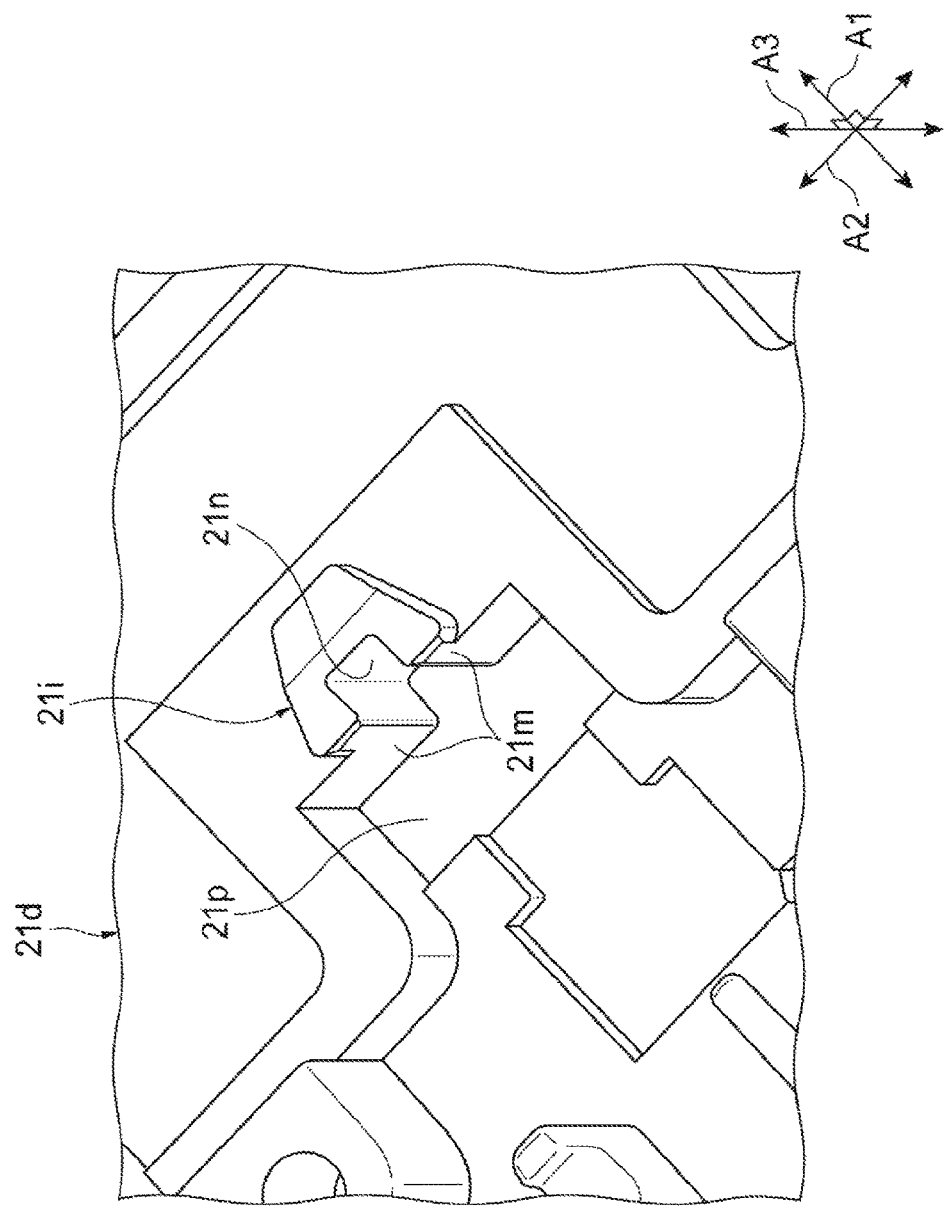
FIG. 12 is a perspective view illustrating a shape of a bottom surface of a case in the modification example.

FIG. 12 is a perspective view illustrating a shape of the bottom surface 21d of the case 21 in the present modification example. In place of the protrusion 21e in the above-described embodiment (refer to FIG. 5), a protrusion 21i is provided on the bottom surface 21d of the present modification example. The protrusion 21i is the first protrusion of the second engagement portion in the present embodiment and protrudes in the direction A3 from the bottom surface 21d. The protrusion 21i prevents the optical transceiver 2 from being ejected from the cage 4 by engaging with the opening portion 43a of the tab 43 of the cage 4 (refer to FIG. 5). The side surface of the protrusion 21i on the rear side is an engagement surface 21m with respect to the opening portion 43a and extends in both the directions A2 and A3. A groove 21n is formed on the engagement surface 21m. The groove 21n has the direction A1 as its depth direction and extends in the direction A3 from the apex of the protrusion 21i to a bottom surface of a recess portion 21p formed on the bottom surface 21d to accommodate the pressing portions 24c and the coupling portion 24h.

Figure 13:
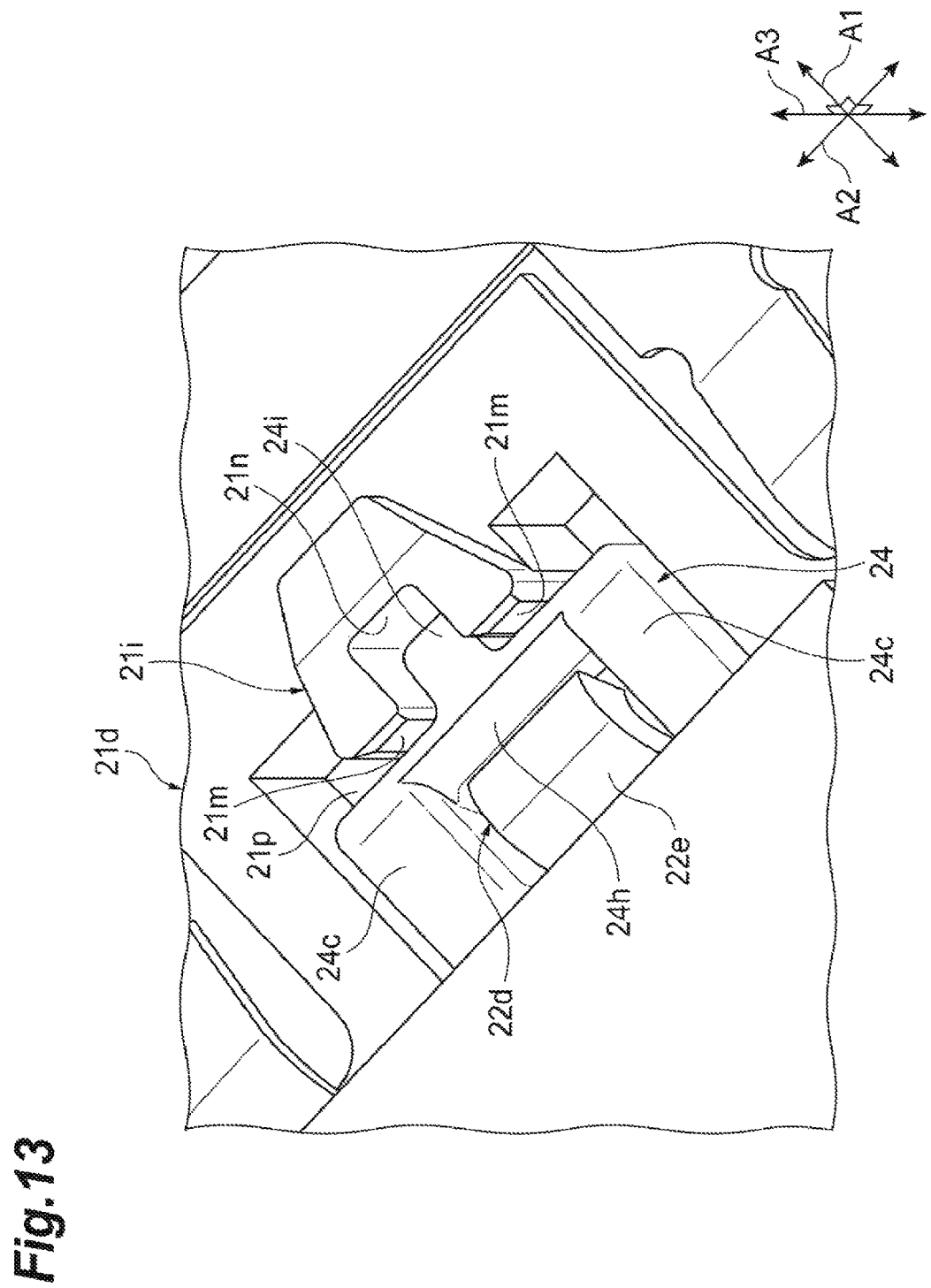
FIG. 13 is a perspective view illustrating a situation in which the pusher is attached to the bottom surface of the case.

FIG. 13 is a perspective view illustrating a situation in which the pusher 24A is attached to the bottom surface 21d of the case 21. As illustrated in FIG. 13, the protrusion 24i of the pusher 24A is accommodated in the groove 21n of the protrusion 21i formed in the bottom surface 21d and is fitted into the groove 21n. Then, when the pusher 24A oscillates, the protrusion 24i is guided by the groove 21n and is able to move inside the groove 21n in the direction A3.

Figure 14:
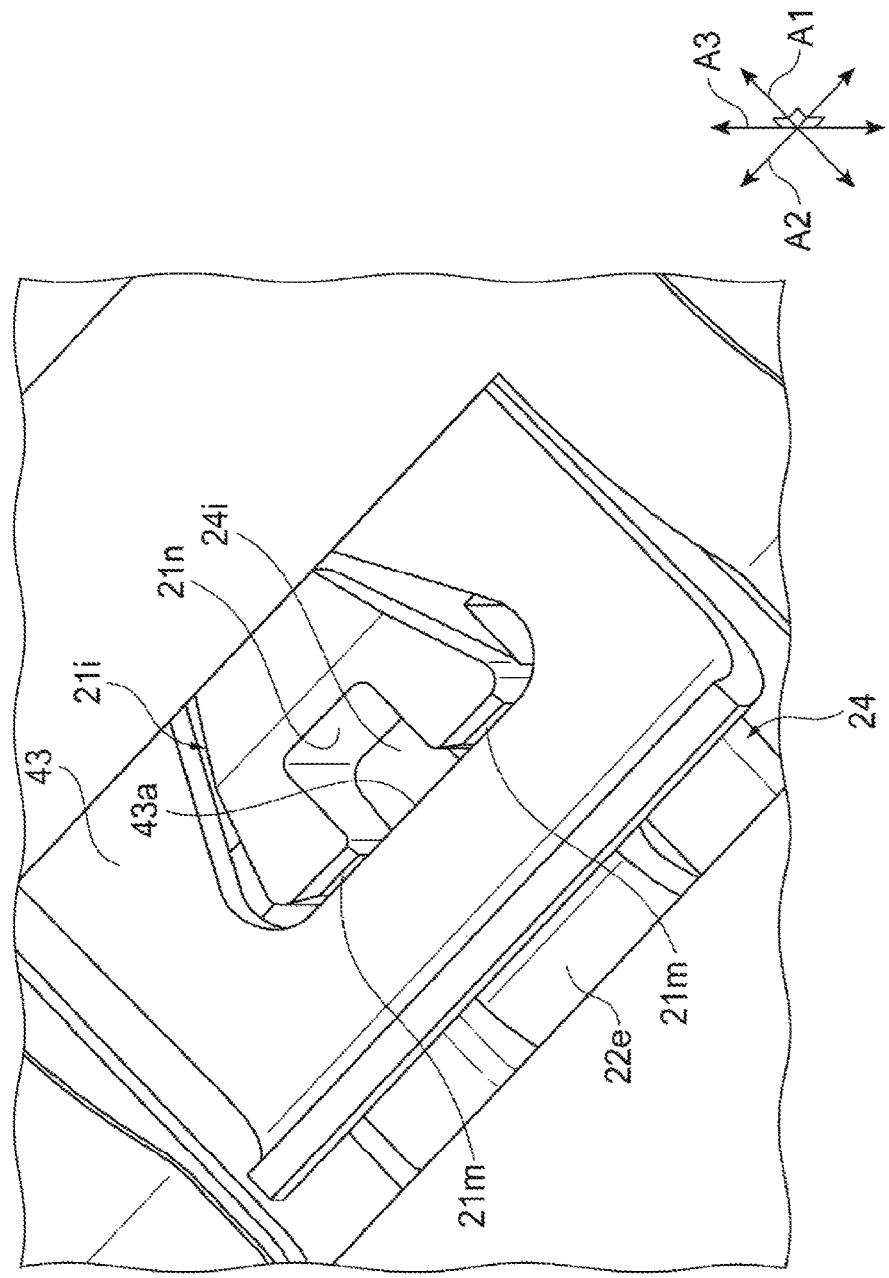
FIG. 14 is a perspective view illustrating a situation of an operation of the pusher.
Figure 15:
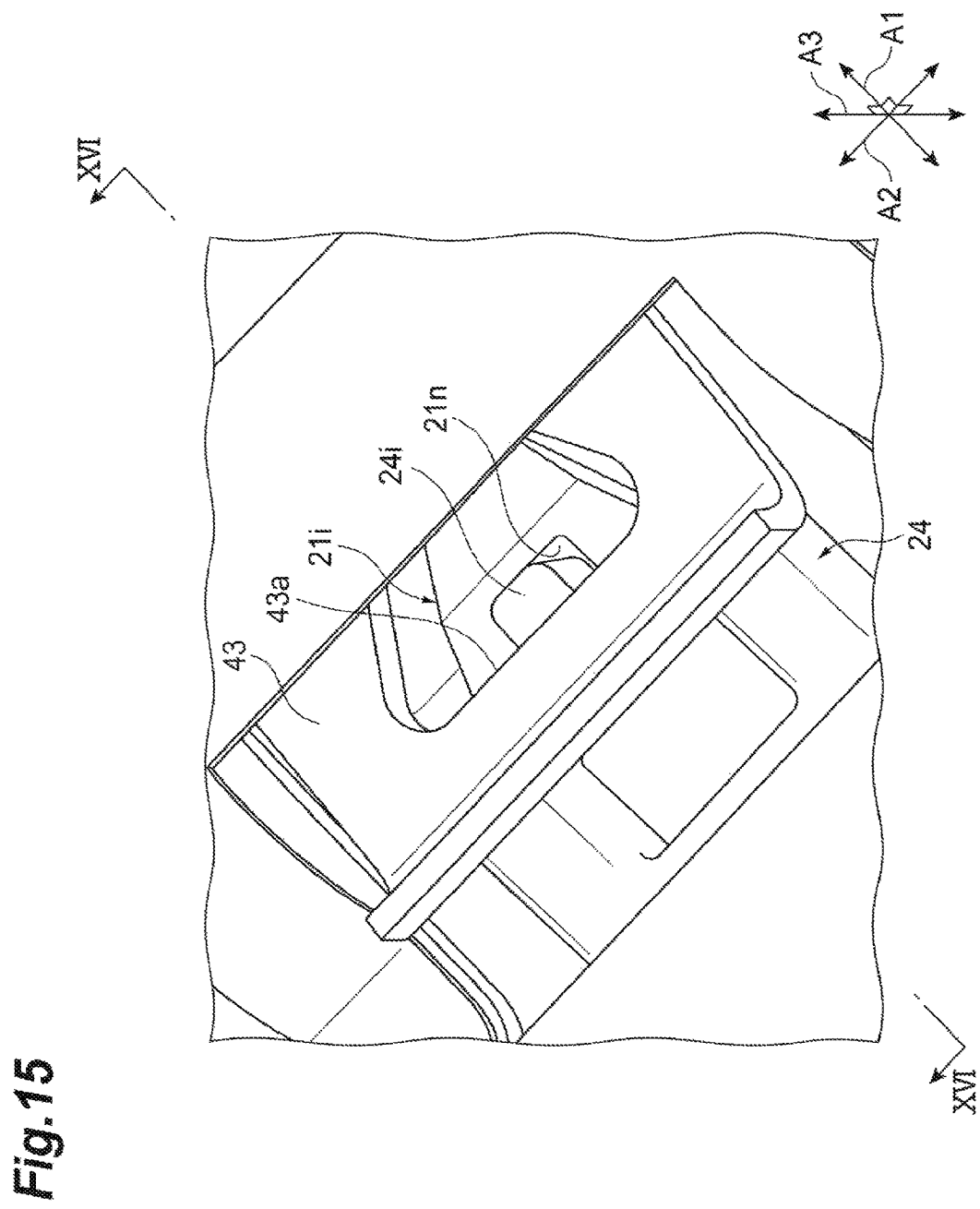
FIG. 15 is a perspective view illustrating another situation of an operation of the pusher.
Figure 16:
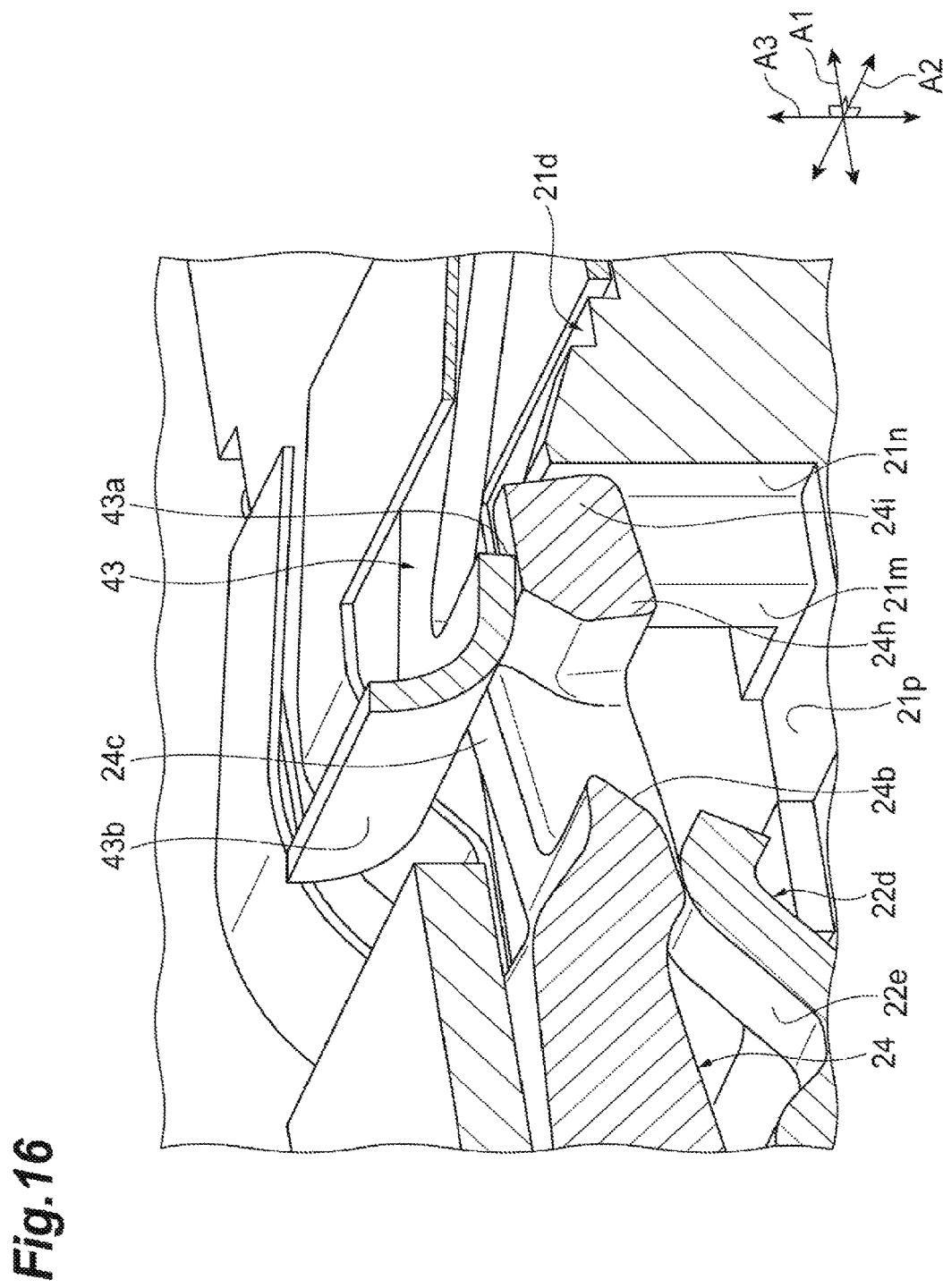
FIG. 16 is a perspective cross-sectional view taken along line XVI-XVI in FIG. 15.
Figure 17A:
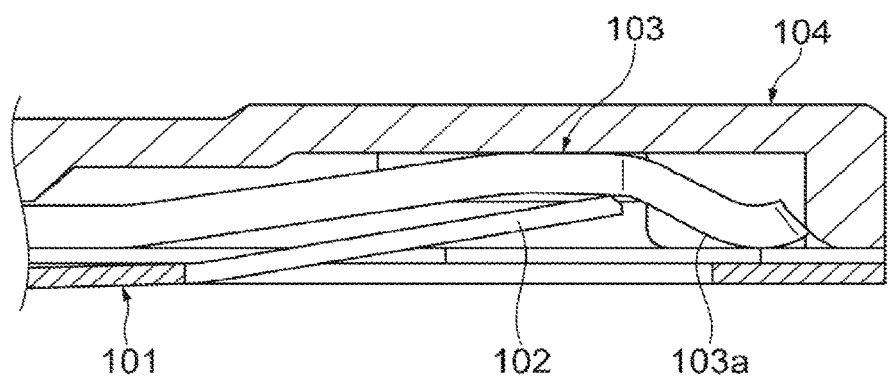
FIGS. 17A and 17B are enlarged cross-sectional views of an engagement piece of a cage and a slide member of an optical transceiver in an optical transceiver insertion/ejection mechanism in the related art.
Figure 17B:
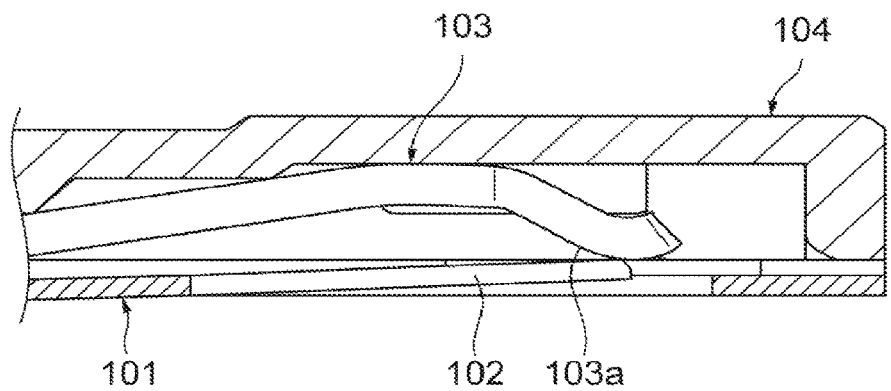
Figure 18A:
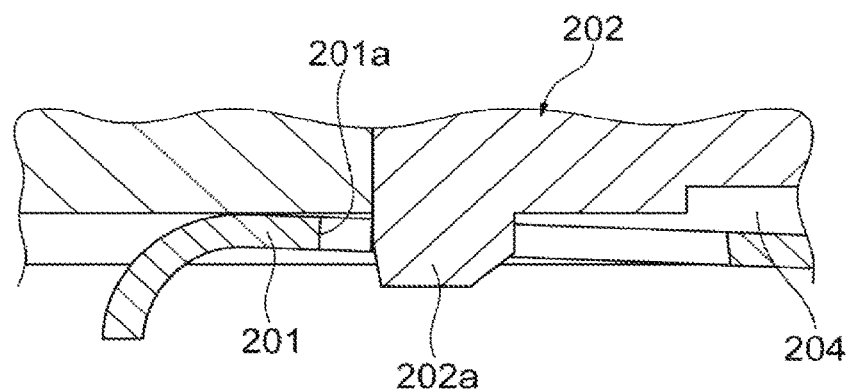
FIGS. 18A and 18B are enlarged cross-sectional views of a structure in the vicinity of the engagement piece of the cage in the optical transceiver insertion/ejection mechanism.
Figure 18B:
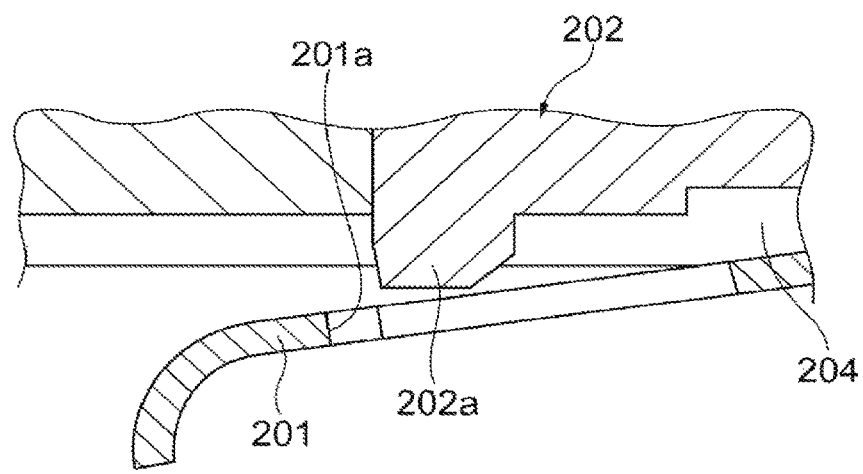

FIGS. 14 and 15 are perspective views illustrating situations of an operation of the pusher 24A. FIG. 16 is a perspective cross-sectional view taken along line XVI-XVI in FIG. 15. As described above, the pusher 24A oscillates around the oscillation shafts 24k (refer to FIGS. 10 and 11) while being interlocked with a movement of the slider 22. FIG. 14 illustrates a state before oscillation, and FIGS. 15 and 16 illustrate a state after oscillation. As illustrated in FIGS. 15 and 16, when the pusher 24A oscillates, the coupling portion 24h and the protrusion 24i come into contact with the tab 43, in addition to the pair of pressing portions 24e. Particularly, the protrusion 24i comes into contact with an inner edge (edge) of the opening portion 43a of the tab 43 on the rear end side (refer to FIG. 16). Then, at the same time when the pair of pressing portions 24c and the coupling portion 24h push the tab 43 outward, the protrusion 24i pushes the inner edge of the opening portion 43a, so that the tab 43 is warped outward from the cage 4, and the tab 43 and the protrusion 21i are disengaged from each other.

As in the present modification example, the protrusion 21i protruding in the direction A3 from the case 21 may engage with the opening portion 43a of the tab 43. For example, due to such a configuration, the optical transceiver 2 can be prevented from being ejected from the cage 4. Then, as in the present modification example, the tab 43 and the protrusion 21i may be disengaged from each other by causing the protrusion 24i of the pusher 24A to push the inner edge of the opening portion 43a. Moreover, the protrusion 21i may have the groove 21n extending in the direction A3 on the engagement surface 21m with respect to the opening portion 43a, and the protrusion 24i of the pusher 24A may move inside the groove 21n in the direction A3. According to such a configuration, since the inner edge of the opening portion 43a to be in contact with the engagement surface 21m can be directly pushed by the protrusion 24i, it is possible to prevent the opening portion 43a from being caught by (stuck in) the protrusion 21i and to more reliably cancel an engagement state between the tab 43 and the protrusion 21i.

The optical transceiver and the optical transceiver insertion/ejection mechanism according to the present disclosure are not limited to the embodiments described above, and various other changes can be made. For example, in the above-described embodiment, the protrusion 22d of the slider 22 and the pusher 24 are provided on the bottom surface 21d of the case 21, and the tab 43 is provided in the bottom plate 41a of the cage 4. However, the mechanism of causing the pusher to oscillate while being interlocked with a movement of the slider, and the pusher may be provided on a different surface of the case 21 (the side surface 21a, the side surface 21b, or the upper surface 21c). The tab may be provided in a different plate of the cage 4.

In addition, in the above-described embodiment, the tab 43 having the opening portion 43a is used as an example of the first engagement portion, and the protrusion 21e of the case 21 is used as an example of the second engagement portion. However, a configuration in which the tab has a protrusion as the first engagement portion and the case has an opening portion as the second engagement portion may be realized. Alternatively, the first engagement portion and the second engagement portion need only be configured to be able to engage with each other, and the form thereof is not particularly limited.

What is claimed is:

1. An optical transceiver which is inserted and ejected with respect to a cage in a first direction, the optical transceiver comprising:
   a case that has a second engagement portion engaging with a first engagement portion provided in the cage to prevent the optical transceiver from being ejected from the cage;
   a slider that is attached to the case and relatively moves relative to the case in the first direction with respect to the case, the slider having a concave portion; and
   a pusher that is oscillatably supported by the case via an oscillation shaft extending in a second direction intersecting the first direction and disengages the first engagement portion and the second engagement portion from each other by pushing the first engagement portion in a third direction intersecting the first direction and the second direction while being interlocked with a movement of the slider, the pusher having a convex portion,
   wherein the oscillation shaft is positioned in an ejecting direction with respect to an interlocking part of the slider and the pusher, and wherein the concave portion of the slider houses the convex portion of the pusher when the second engagement portion engages with the first engagement portion.

2. The optical transceiver according to claim 1, further comprising:
a pull-tab that is fixed to the slider.

3. The optical transceiver according to claim 1,
wherein a mechanism causing the pusher to oscillate while being interlocked with a movement of the slider has an inclined surface which is provided in one of the slider and the pusher and is inclined with respect to the first direction, and a contact portion which is provided in the other of the slider and the pusher and comes into contact with the inclined surface.

4. The optical transceiver according to claim 3,
wherein the pusher has a projected shape which is projected toward the slider and includes the contact portion, and
wherein the slider has a recessed shape which includes the inclined surface and follows the projected shape.

5. The optical transceiver according to claim 1,
wherein the oscillation shaft and the interlocking part are positioned in a substantial center portion of the pusher in the second direction.

6. The optical transceiver according to claim 1,
wherein a distance between a position in at which the pusher pushes the first engagement portion, and the oscillation shaft is longer than a distance between the interlocking part and the oscillation shaft.

7. The optical transceiver according to claim 1, further comprising:
an elastic member that is fixed to the case and biases the slider in an inserting direction.

8. The optical transceiver according to claim 1,
wherein the second engagement portion has a first protrusion protruding in the third direction from the case, and the first protrusion engages with an opening portion of the first engagement portion.

9. The optical transceiver according to claim 8,
wherein the pusher has a second protrusion, and the second protrusion disengages the first engagement portion and the second engagement portion by pushing an inner edge of the opening portion.

10. The optical transceiver according to claim 9,
wherein the first protrusion has a groove extending in the third direction on an engagement surface with respect to the opening portion, and
wherein the second protrusion of the pusher moves inside the groove in the third direction.

11. An optical transceiver insertion/ejection mechanism comprising:
a cage that extends in a first direction and has an opening at one end; and
an optical transceiver that is inserted and ejected with respect to the cage through the opening,
wherein the cage has
a cage main body which has a space for accommodating the optical transceiver, and
a first engagement portion which extends in the first direction, of which one end on the opening side is fixed to the cage main body, of which the other end is a free end, and in which the other end is elastically displaceable in a third direction intersecting the first direction,
wherein the optical transceiver has
a case which has a second engagement portion engaging with the first engagement portion to prevent the optical transceiver from being ejected from the cage,
a slider which is attached to the case and relatively moves relative to the case in the first direction with respect to the case, the slider having a concave portion, and
a pusher which is oscillatably supported by the case via an oscillation shaft extending in a second direction intersecting the first direction and the third direction and disengages the first engagement portion and the second engagement portion from each other by pushing the first engagement portion in the third direction while being interlocked with a movement of the slider, the pusher having a convex portion, and
wherein the oscillation shaft is positioned in an ejecting direction with respect to an interlocking part of the slider and the pusher, and
wherein the concave portion of the slider houses the convex portion of the pusher when the second engagement portion engages with the first engagement portion.

12. An optical transceiver which is inserted and ejected with respect to a cage in a first direction, the optical transceiver comprising:
a case that has a second engagement portion engaging with a first engagement portion provided in the cage to prevent the optical transceiver from being ejected from the cage;
a slider that is attached to the case and relatively moves relative to the case in the first direction with respect to the case; and
a pusher that is oscillatably supported by the case via an oscillation shaft extending in a second direction intersecting the first direction and disengages the first engagement portion and the second engagement portion from each other by pushing the first engagement portion in a third direction intersecting the first direction and the second direction while being interlocked with a movement of the slider,
wherein the oscillation shaft is positioned in an ejecting direction with respect to an interlocking part of the slider and the pusher,
wherein the second engagement portion has a first protrusion protruding in the third direction from the case, and the first protrusion engages with an opening portion of the first engagement portion,
wherein the pusher has a second protrusion, and the second protrusion disengages the first engagement portion and the second engagement portion by pushing an inner edge of the opening portion,
wherein the first protrusion has a groove extending in the third direction on an engagement surface with respect to the opening portion, and
wherein the second protrusion of the pusher moves inside the groove in the third direction.

* * * * *